(No Model.)

J. W. SURSA & J. T. DOWDALL.
COTTON CULTIVATOR.

No. 266,734. Patented Oct. 31, 1882.

Attest:
Charles Pickles
John W. Herthel

Inventors:
James W. Sursa
and John T. Dowdall
per Herthel & Co
Atty's

UNITED STATES PATENT OFFICE.

JAMES W. SURSA AND JOHN T. DOWDALL, OF ST. LOUIS, MISSOURI.

COTTON-CULTIVATOR.

SPECIFICATION forming part of Letters Patent No. 266,734, dated October 31, 1882.

Application filed June 26, 1882. (No model.)

*To all whom it may concern:*

Be it known that we, JAMES W. SURSA and JOHN T. DOWDALL, citizens of the United States, residing at St. Louis, and State of Missouri, have invented a new and useful Improved Cotton-Cultivator, &c., of which the following is a specification.

Our invention relates to improvements in cotton-cultivators in which vertical cutter-blades operate in conjunction with mold-boards or plowshares on each side, so that the implement can straddle the ridge or row of standing cotton, corn, sugar-cane, or other plant to be cultivated.

The objects of our improvements are to afford facilities for the proper adjustment of the cutter-blades and plowshares independently of each other, to suit the slope of the ridge, its width, also suit shallow or deep plowing, and otherwise adapt the implement the better to suit the nature of the soil and plant; also, to combine the essential parts of the implement—such as the tongue, cutter-blades having bevel cutting-edge, and plow-shares on each side—so that the implement can at all times be made to "hug" the ridge, or be easily retained in line to work smooth and regular and without "wabbling" action. We attain these objects by the mechanism illustrated in the accompanying drawings, in which—

Figure 1:
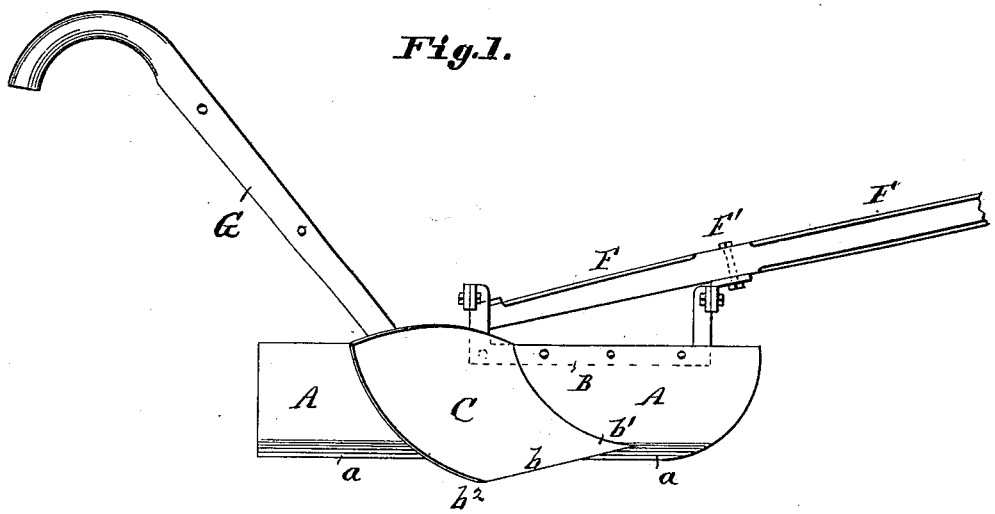
Figure 2:
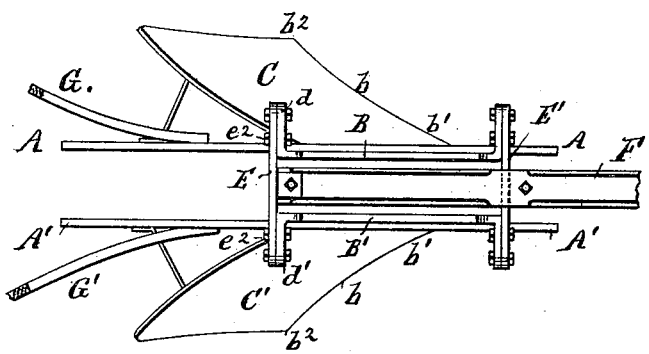
Figure 3:
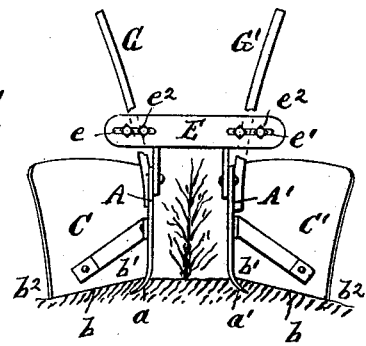
Figure 4:
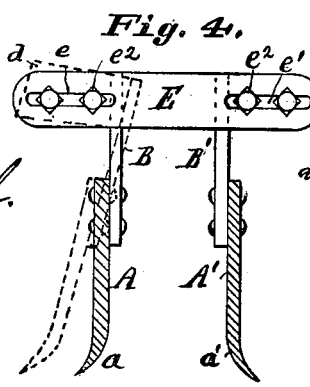

Figure 1 is a side elevation. Fig. 2 is a top-plan view. Fig. 3 is a rear view of the implement, also showing same straddling a cotton-ridge and manner of the bevel-edges of the cutter-blades cutting into the top of the ridge. Fig. 4 is an enlarged detail cross-section, chiefly to show the slotted plates uniting adjustably the two cutter-blades, and by means whereof the latter can be made laterally adjustable.

Similar letters refer to similar parts throughout the several views.

A A' represent the cutter-blades. These are attached to frame-pieces B B'. (See figures.)

$a$ $a'$ represent the lower cutting-edges, and extend the entire length of the cutter-blades. (See Figs. 1, 3, 4.) Further, these cutting-edges $a$ $a'$ we make tapering or beveled, as shown, so that their cut into the soil will always be in a direction outward from the top face of the ridge, and as indicated in Fig. 3. The cut made by these sharp bevel-edges is therefore such that the base of the ridge or strip of earth left is wider at the base than the top face or surface, (see Fig. 3;) also, said beveled edges afford the implement a bearing on each side, which the better retains it in line, top of, or to hug the ridge, at same time cutting the rubbish, grass, weeds, &c., and loosening the soil preparatory to the action of the plows.

C C' represent the respective mold-boards or plowshares, which we attach one to each outer face of the cutter-blades A A'. (See Figs. 1, 2, 3.) We arrange each plowshare so that its cutting-edge or share $b$ shall taper or incline—that is to say, the inner point, $b'$, of the share $b$ projects above the bevel cutting-edge of the cutter-blade, while the outer point, $b^2$, of plowshare projects below the lowest point of the bevel cutting-edge. (See Figs. 1 and 3.)

The forward part or portion of the bevel cutting-edge beyond the plowshare $b$ is thus permitted to cut the soil preparatory to the action of the plowshare or mold-board, and specially the front or forward extension of the bevel cutting-edge of the cutter-blade can be first lifted or made to ride over any serious obstruction, in doing so carrying the plowshare with it, thus facilitating the keeping of the implement in line with the draft of the team.

The cutter-blades A A', carrying the plowshares C C', are laterally adjustable by the means as follows: The frame-pieces B B' have outward-extending arms or branch plates at $d$ $d'$, and these have holes to receive the fastening-bolts. Additional straps or plates, E E', are provided, having elongated slots $e$ $e'$, and these are placed transversely to the frame-pieces B B', so that the said slotted plates come alongside of the plates $d$ $d'$, and finally the said plates are secured together by bolts $e^2$, as shown more clearly in Figs. 2, 3, and 4. To widen or narrow the distance between the cutter-blades, the fastening-bolts are loosened and the frame-pieces B B', carrying the cutter-blades and plows, are moved farther apart or closer together, as the case may be, (the elongated slots permit this action,) and finally the parts, when adjusted, are secured firmly by the bolts. Thus the cutter-blades and plows are made laterally adjustable to adapt their operation to the varying kinds of ridges or to suit the width of the top surface of same.

The same means for adjustment just described permits a further adjustment of the cutter-blades and plows—viz., the cutter-blades can be set from a vertical to an incline position, in order to raise or lower the outer point of the plows. This latter adjustment of the parts is suitable for and adapts the implement to perform deep or shallow plowing or scraping of the soil, as the nature thereof may require. (See Fig. 4.)

F is a tongue rigidly secured top of the implement, so as not to interfere with the adjustability of the parts. Hence the lower or rear end of the tongue we secure to the under side of the rear transverse plate, and at F' the tongue passes over or top of the front transverse plate, the joint being made by U-straps and bolts.

G G' are the plow-handles.

What we claim is—

1. In combination with the cutter-blades A A', plowshares C C', frame-pieces B B', having lateral arms or plates d d', the transverse straps or plates E E', having elongated slots, and the fastening-bolts, by means whereof the lateral adjustment and inclination of the said cutter-blades and plows can be made, in the manner and for the purposes set forth.

2. The combination, with tongue F, of the cutter-blades A A', having bevel cutting-edges a a', the plowshares C C', having their inner cutting-point, b', raised higher than the said bevel cutting-edge, the latter also extending forward of the plows, as shown and described, the frame-pieces B B', having lateral arms d d', transverse straps or plates E E', having elongated slots, and fastening-bolts, all said parts forming the improved cultivator, substantially as set forth.

In testimony of said invention we have hereunto set our hands in presence of witnesses.

JAMES W. SURSA,
JOHN T. DOWDALL.

Witnesses:
WILLIAM W. HERTHEL,
JOHN W. HERTHEL.